US008594088B2

(12) United States Patent
Saltsidis et al.

(10) Patent No.: US 8,594,088 B2
(45) Date of Patent: Nov. 26, 2013

(54) MULTICASTING IN A PROVIDER BACKBONE BRIDGE NETWORK

(75) Inventors: Panagiotis Saltsidis, Stockholm (SE); Mickael Fontaine, Borgenhaugen (NO)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 12/921,852

(22) PCT Filed: Dec. 8, 2009

(86) PCT No.: PCT/SE2009/051385
§ 371 (c)(1),
(2), (4) Date: Sep. 10, 2010

(87) PCT Pub. No.: WO2010/068166
PCT Pub. Date: Jun. 17, 2010

(65) Prior Publication Data
US 2011/0228774 A1    Sep. 22, 2011

Related U.S. Application Data

(60) Provisional application No. 61/120,640, filed on Dec. 8, 2008.

(51) Int. Cl.
*H04L 12/00*    (2006.01)
(52) U.S. Cl.
USPC ............ 370/390; 370/401; 370/258; 370/236
(58) Field of Classification Search
USPC ............... 370/390, 389, 401–404, 473–474, 370/310.2, 312, 351–359, 328, 338, 370/236–238; 709/207, 239, 217, 218, 219, 709/229
See application file for complete search history.

(56) References Cited

U.S. PATENT DOCUMENTS

| 5,933,425 A * | 8/1999 | Iwata ............................ 370/351 |
| 6,775,692 B1 * | 8/2004 | Albert et al. .................. 709/207 |
| 7,539,770 B2 * | 5/2009 | Meier ............................ 709/236 |
| 7,586,895 B2 * | 9/2009 | Borgione ...................... 370/349 |

(Continued)

FOREIGN PATENT DOCUMENTS

EP    1950907 A1    7/2008

OTHER PUBLICATIONS

IEEE: "IEEE Standard for Local and metropolitan area networks Virtual Bridged Local Area Networks Amendment 7: Provider Backbone Bridges; IEEE Std 802.1ah-2008 (Amendment to IEEE Std 802.10-2005)" IEEE Standard, IEEE: Piscataway. NJ, USA, Aug, 14, 2008, XP017602038.

(Continued)

*Primary Examiner* — Dang Ton
*Assistant Examiner* — Sai Aung

(57) ABSTRACT

A method and Provider Backbone Bridge (PBB) for handling customer multicast frames that are received by a Customer Network Port or Provider Network Port on an I-component of the PBB. Customer multicast frames that are forwarded to a Virtual Instance Port (VIP) on the I-component are encapsulated with a Backbone Destination Address (B-DA) equal to the original Customer Destination Address (C-DA) of the received customer multicast frames instead of the Default B-DA. This capability may be controlled by an "EnableCustomerMulticast" parameter enabling the above behavior to be independently set for each VIP on the I-component.

14 Claims, 5 Drawing Sheets

(56) References Cited

U.S. PATENT DOCUMENTS

| | | | |
|---|---|---|---|
| 7,724,745 B1* | 5/2010 | Elangovan et al. | 370/392 |
| 7,787,380 B1* | 8/2010 | Aggarwal et al. | 370/236 |
| 7,792,100 B2* | 9/2010 | Hato et al. | 370/389 |
| 7,855,950 B2* | 12/2010 | Zwiebel et al. | 370/216 |
| 8,005,081 B2* | 8/2011 | Bragg et al. | 370/389 |
| 8,169,924 B2* | 5/2012 | Sajassi et al. | 370/249 |
| 8,223,765 B2* | 7/2012 | Na | 370/390 |
| 2002/0141389 A1* | 10/2002 | Fangman et al. | 370/352 |
| 2004/0184407 A1* | 9/2004 | Pok et al. | 370/236 |
| 2004/0184408 A1* | 9/2004 | Liu et al. | 370/236 |
| 2004/0252691 A1* | 12/2004 | Hori et al. | 370/390 |
| 2005/0068914 A1* | 3/2005 | Lee et al. | 370/312 |
| 2005/0078668 A1* | 4/2005 | Wittenberg et al. | 370/389 |
| 2007/0127376 A1* | 6/2007 | Chao et al. | 370/230 |
| 2007/0217415 A1* | 9/2007 | Wijnands et al. | 370/390 |
| 2008/0186965 A1* | 8/2008 | Zheng et al. | 370/389 |
| 2010/0106851 A1* | 4/2010 | Aoki et al. | 709/231 |
| 2011/0216772 A1* | 9/2011 | Mohan et al. | 370/392 |

OTHER PUBLICATIONS

Interworking Task Group of IEEE 802 1: "IEEE P802.10—REV/D5.0 Virtual Bridged Local Area Networks—Revision" Internet Citation Sep. 12, 2005, XP002471514 Retrieved from the Internet: URL: http://ieeexplore.ieee.org/Xplore/dynhome.jsp>.

* cited by examiner

_US 8,594,088 B2_

MULTICASTING IN A PROVIDER BACKBONE BRIDGE NETWORK

RELATED APPLICATIONS

This application claims the benefit of U.S. Provisional Application No. 61/120,640, filed Dec. 8, 2008, the disclosure of which is fully incorporated herein by reference.

TECHNICAL FIELD

The present invention relates generally to communication networks, and in particular, to a method and node in a communication network for multicasting in a Provider Backbone Bridge Network (PBBN).

BACKGROUND

Multicast is the preferred method for distributing Internet Protocol Television (IPTV) to residential users. The Internet Group Management Protocol (IGMP) is an IP-based control protocol that is used to signal membership of an end station to a multicast group (TV channel) in a bridged network. In order to reap the benefits associated with multicast, IGMP snooping may be employed by intermediary nodes to prune multicast trees in a network to make efficient use of limited resources.

IGMP snooping is designed to prevent hosts on a local network from receiving traffic for a multicast group they have not explicitly joined. IGMP snooping is a feature that allows a layer 2 switch to "listen in" on the IGMP conversation between hosts and routers by processing the layer 3 IGMP packets sent in a multicast network. When IGMP snooping is enabled in a switch, the switch analyzes all IGMP packets between hosts connected to the switch and multicast routers in the network. When a switch hears an IGMP report from a host for a given multicast group, the switch adds the host's port number to the multicast list for that group. Likewise, when the switch hears an IGMP Leave, it removes the host's port from the table entry. Thus, IGMP snooping provides switches with a mechanism to prune multicast traffic from links that do not contain a multicast listener (i.e., IGMP client).

Several IEEE standards impact the multicasting of IPTV over Provider Backbone Bridge Networks (PBBNs) and Provider Bridge Networks (PBNs). The applicable standards are IEEE Standard 802.1ad (Provider Bridges), IEEE Standard 802.1ah (Provider Backbone Bridges), and IEEE Standard 802.1ak (Multiple Registration Protocol).

Ethernet is L2 and IP is L3, but both protocols perform packet switching; both can scale globally; both use dynamic topology protocols; and both can provide protection, Quality of Service (QoS), and traffic engineering. The fundamental difference is connectivity; IP can provide global any-to-any connectivity while Provider Ethernet can provide global connectivity between provisioned sets of network interfaces.

IGMP snooping performs a layer violation between layer 3 (IP) and layer 2 (Ethernet) because it is an IP protocol that controls the behavior of multicast streams in Ethernet bridges. This may cause problems in PBBNs (802.1ah) as the IGMP Packet Data Units (PDUs) are encapsulated in backbone frames.

FIG. 1 is a simplified block diagram of a PBBN 11 interfacing with two PBNs 12-13 to distribute a multicast service. In this example, a point-to-point backbone VLAN service is established in the PBBN to distribute the multicast service to the PBNs. Ingress Ethernet frames from the PBNs are encapsulated with new header fields including the Backbone source and destination Media Access Control (MAC) addresses, B-tag, and I-tag. In essence this completely hides IGMP messages in the PBBN and makes IGMP snooping impossible.

In this scenario, even L2 multicast protocols such as the MAC Address Multiple Registration Protocol (MMRP) are insufficient. The problem is associated with the way that PBN customer frames are encapsulated by the Backbone Edge Bridges (BEBs) at the edges of the PBBN. According to the IEEE Std 802.1ah-2008, standard customer frames that have a Group MAC address as their destination address are encapsulated into Backbone frames that always have the Default Backbone Destination address as their Backbone destination MAC address. The Default Backbone Destination address is a special address built by concatenating the Provider Backbone Bridge Organizationally Unique Identifier (OUI) (00-1E-83) with the Service Instance Identifier (I-SID) value identifying the customer service instance in the backbone. This does not allow differentiation of the customer multicast services in the backbone and severely constrains the pruning capabilities on these services. Customer multicast frames associated with the same backbone I-SID are always mapped to the same backbone multicast service and correspondingly the capability to individually control each such multicast service in the backbone is lost.

SUMMARY

Accordingly, there is a need for an improved method and node for multicasting in a Provider Backbone Bridge Network (PBBN).

The present invention provides a new way of handling customer multicast frames that are received by the Customer Network Port (CNP) or Provider Network Port (PNP) on an I-component of a Provider Backbone Bridge (PBB). Instead of encapsulating these frames with a Backbone Destination Address (B-DA) that is equal to the Default Backbone Destination address, multicast customer frames that are forwarded to a Virtual Instance Port (VIP) on the I-component are, in one embodiment, encapsulated with a B-DA equal to the original Customer Destination Address (C-DA) of the received customer multicast frame. This capability may be controlled by an "EnableCustomerMulticast" parameter enabling the above behavior to be independently set for each VIP on an I-component. When the parameter is set, the backbone B-DA to be used for the encapsulated backbone frames is the received multicast C-DA. The default value for the parameter may be set to zero (0), which corresponds to the traditional behavior of encapsulating customer multicast frames with the Default Backbone Destination address.

The present invention enables customer multicast services to be set up through a PBBN. This may be achieved by utilizing the MMRP protocol, which can now run between the PBN and PBBN domains as if it were a single domain. Alternatively, the Invention may utilize an IGMP-MMRP interworking function if the customer multicast domain is on L3 while MMRP is supported in the backbone domain. If MMRP is not supported, an algorithm is used by all intermediate bridge components in order to identify IGMP frames and perform IGMP snooping.

Thus, in one embodiment, the present invention is directed to a method of propagating multicast frames that are received by an I-component of a Provider Backbone Bridge. The method includes the steps of encapsulating the received customer multicast frames with a B-DA equal to an original C-DA; and propagating the encapsulated frames toward the C-DA using the methods provided by the operation of MMRP or IGMP snooping.

In another embodiment, the present invention is directed to a Provider Backbone Bridge (PBB) having an I-component. The includes an input port of the I-component for receiving customer frames; a frame analyzer for determining that the received frames are multicast frames; a frame encapsulation unit for encapsulating the received frames with a B-DA equal to an original C-DA of the received customer multicast frames; and an output port for propagating the encapsulated frames toward the C-DA.

In another embodiment, the present invention is directed to a method of propagating multicast frames in a PBBN. The method includes the steps of receiving customer frames by an input port on an I-component of a Provider Backbone Bridge; analyzing the customer multicast frames to determine whether a connection_identifier is not null and whether the connection_identifier references an address retained by a Provider Instance Port; and upon determining that the connection identifier is not null and the connection identifier references an address retained by the Provider Instance Port, setting a B-DA equal to an address referenced by the connection_identifier. Upon determining that the connection identifier is null, the method determines whether the C-DA received in the customer frames is a Group MAC address and an EnableCustomerMulticast parameter of a VIP on the I-component is set to a predefined value. Upon determining that the received C-DA is a Group MAC address and the EnableCustomerMulticast parameter of the VIP is set to the predefined value, the B-DA is set equal to the received C-DA. When the received C-DA is not a Group MAC address, and/or the EnableCustomerMulticast parameter of the VIP is not set to the predefined value, the B-DA is set equal to the contents of a Default Backbone Destination parameter of the VIP.

In another embodiment, the present invention is directed to a computer-implemented method in a bridge component for determining whether to perform IGMP snooping on a received Ethernet frame. The method includes the steps of a) bypassing by the component, a first twelve bytes of the Ethernet frame identifying a MAC DA and MAC SA, and analyzing subsequent bytes identifying a first Ethertype field; b) determining by the component whether the next two bytes are equal to 81-00 or 88-A8; c) upon determining that the next two bytes are equal to 81-00 or 88-A8, bypassing the next two subsequent bytes and repeating steps b) and c) until the next two bytes are not equal to 81-00 or 88-A8; d) when the next two bytes are not equal to 81-00 or 88-A8, determining by the component whether the next two bytes are equal to 88-e7; e) upon determining that the next two bytes are equal to 88-e7, bypassing by the component, the next 16 subsequent bytes and repeating steps b) through e) until the next two bytes are not equal to 88-e7; f) when the next two bytes are not equal to 88-e7, determining by the component whether the next two bytes identify an IGMP frame; g) upon determining that the next two bytes identify an IGMP frame, performing IGMP snooping on the frame; and h) upon determining that the next two bytes do not identify an IGMP frame, declining to perform IGMP snooping on the frame.

In another embodiment, the present invention is directed to a computer-implemented method of propagating a customer-initiated MAC Address Multiple Registration Protocol (MMRP) packet data unit (PDU) in the backbone domain, wherein the MMRP PDU is received by a Customer Network Port or Provider Network Port on an I-component of a Provider Backbone Bridge (PBB), and is propagated to other Bridge ports within a VLAN context. The method is characterized by encapsulating the propagated MMRP PDUs according to the following steps when a VIP is part of the VLAN context: when a connection_identifier associated with the received PDU is not null, setting the B-DA equal to an address referenced by the connection_identifier; when the connection_identifier is null, determining whether the C-DA received in the PDU is a Group MAC address and whether an EnableCustomerMulticast parameter of the Virtual Instance Port is set to a predefined value; when the received C-DA is a Group MAC address and the EnableCustomerMulticast parameter of the VIP is set to the predefined value, setting the B-DA equal to the received C-DA; and when the received C-DA is not a Group MAC address, and/or the EnableCustomerMulticast parameter of the VIP is not set to the predefined value, setting the B-DA equal to the contents of a Default Backbone Destination parameter of the VIP. The method also includes the steps of receiving one of the propagated MMRP PDUs at a Customer Backbone Port on a B-Component that implements the MMRP protocol; determining by the receiving Customer Backbone Port, whether the received PDU is an MMRP PDU; and propagating all identified MMRP PDUs within the VLAN context corresponding to a Backbone VLAN Identifier, B-VID, value associated with the received PDU.

DETAILED DESCRIPTION

The present invention introduces a new parameter, which may for example be a binary parameter, referred to herein as the "EnableCustomerMulticast" parameter, on each VIP port on an I-component. By default, every VIP port has this parameter set to zero (0). If the parameter is set to one (1), every customer multicast frame that is forwarded to this VIP is encapsulated with a Backbone MAC Destination Address which is equal to the multicast C-DA address. All the other Provider Instance Port (PIP) functions remain the same as described in IEEE Std 802.1ah-2008.

Figure 1:
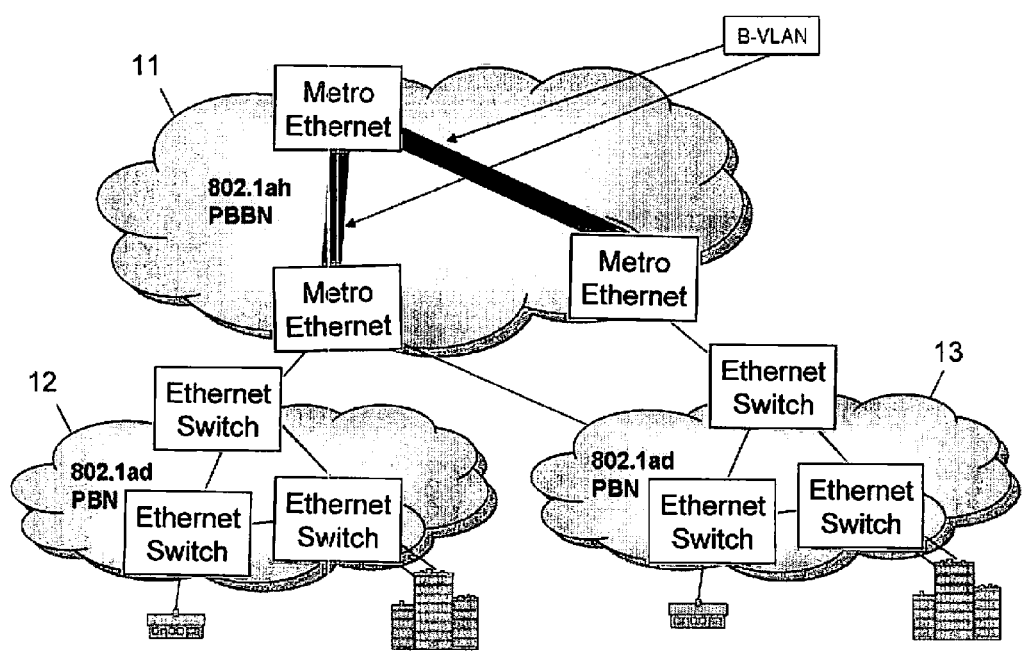
FIG. 1 is a simplified block diagram of a PBBN interfacing with two PBNs to distribute a multicast service.
Figure 2:
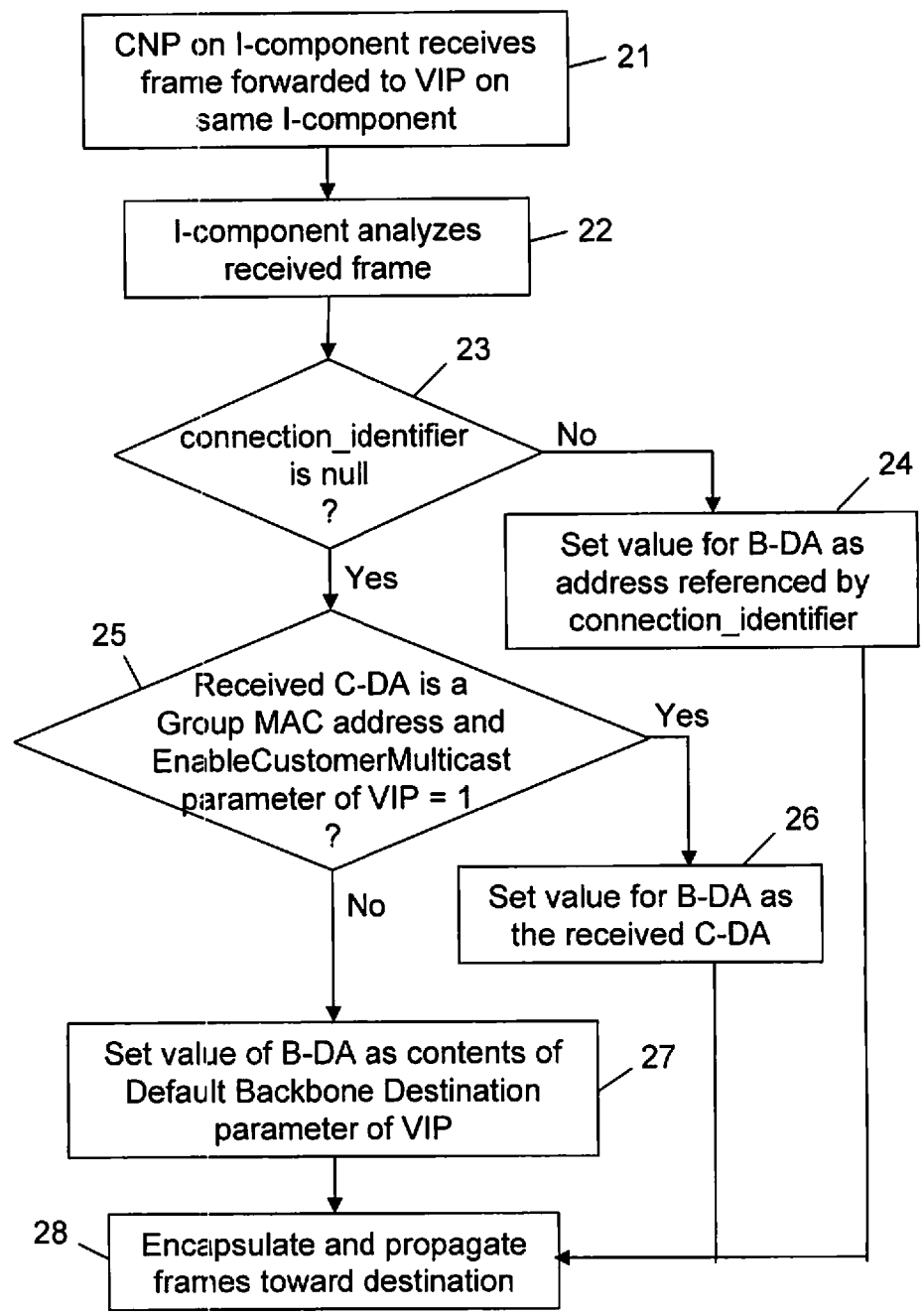
FIG. 2 is a flow chart illustrating the steps of an embodiment of the method of the present invention in which the B-DA is set for a frame emitted by a Provider Instance Port (PIP)

FIG. 2 is a flow chart illustrating the steps of an embodiment of the method of the present invention in which the B-DA is set for a frame emitted by a PIP. At step 21, a Customer Network Port (CNP) on an I-component receives a frame that is forwarded to a Virtual Instance Port (VIP) on the same I-component. At step 22, the I-component analyzes the received frame. At step 23, it is determined whether the connection_identifier for the received frame is null. If the connection_identifier is not null, it will contain an address retained by the PIP. Thus, the method moves to step 24, where the value for the B-DA is set as the address referenced by the connection_identifier. If the connection_identifier is null, the method moves to step 25, where it is determined whether the received C-DA is a Group MAC address and the EnableCustomerMulticast parameter of the Virtual Instance Port is set to one (1). If so, the method moves to step 26, where the value for the B-DA is set as the received C-DA. If not, the method moves to step 27, where the value of the B-DA is set as the contents of the Default Backbone Destination parameter of the Virtual Instance Port. At step 28, the frames are encapsulated utilizing the selected B-DA and propagated through the network toward the destination.

The above modifications enable Customer multicast addresses to be visible in the Backbone and correspondingly allow control of the customer multicast services in a PBBN. In particular if the customer network is running the MAC Address Multiple Registration Protocol (MMRP), the customer MMRP PDUs can be propagated in the Backbone network in order to set up backbone multicast services based on the customer multicast services.

Figure 3:
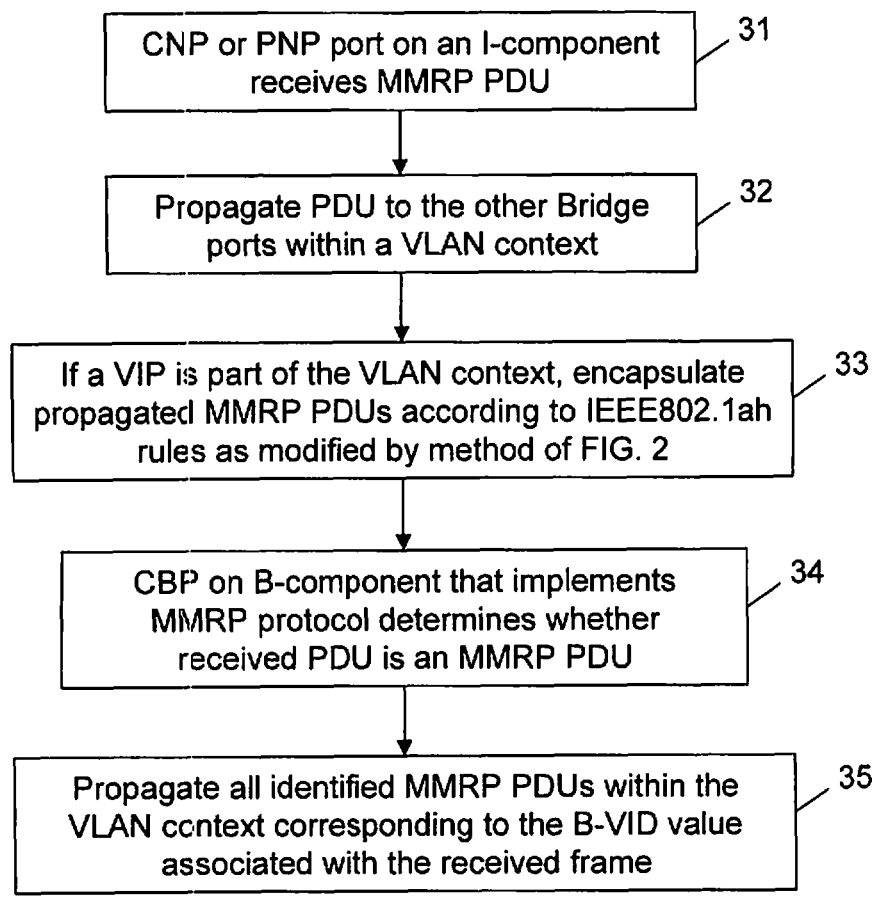
FIG. 3 is a flow chart illustrating the steps of an embodiment of the method of the present invention for propagating a Customer-initiated MMRP PDU in the backbone domain.

FIG. 3 is a flow chart illustrating the steps of an embodiment of the method of the present invention for propagating a Customer-initiated MMRP PDU in the backbone domain. At step 31, an MMRP PDU is received by a CNP or PNP port on an I-component. At step 32, the PDU is propagated to the other Bridge ports within a VLAN context as described in 10.11 of IEEE Std 802.1ak-2008. At step 33, if a VIP is part of this VLAN context, the propagated MMRP PDUs are encapsulated according to the IEEE802.1ah rules as modified by the method of FIG. 2. At step 34, a Customer Backbone Port (CBP) on a B-Component that implements the MMRP protocol checks the frame's Destination address and Ethertype in order to determine whether the received PDU is an MMRP PDU. The Ethertype is hidden below the frame's I-TAG but it can be visible by using the backbone service instance multiplex entity described in 6.18 of IEEE Standard 802.1ah-2008. At step 35, all identified MMRP PDUs are propagated within the VLAN context corresponding to the Backbone VLAN Identifier (B-VID) value associated with the received frame (i.e., the value in the B-VID column in the Backbone Service Instance table associated with the received I-SID, or if this is not supported, the value of the PVID parameter associated with this CBP port).

If the multicast services in the customer domain are set by IGMP snooping while MMRP is implemented in the backbone domain, an IGMP-MMRP interworking function can be used in order to provide seamless interoperability between the IGMP-based and the MMRP-based networks. The interworking function may be implemented on the VIPs, and the CBPs receiving the MMRP PDUs implement the functions presented in steps 34-35 above.

Figure 4:
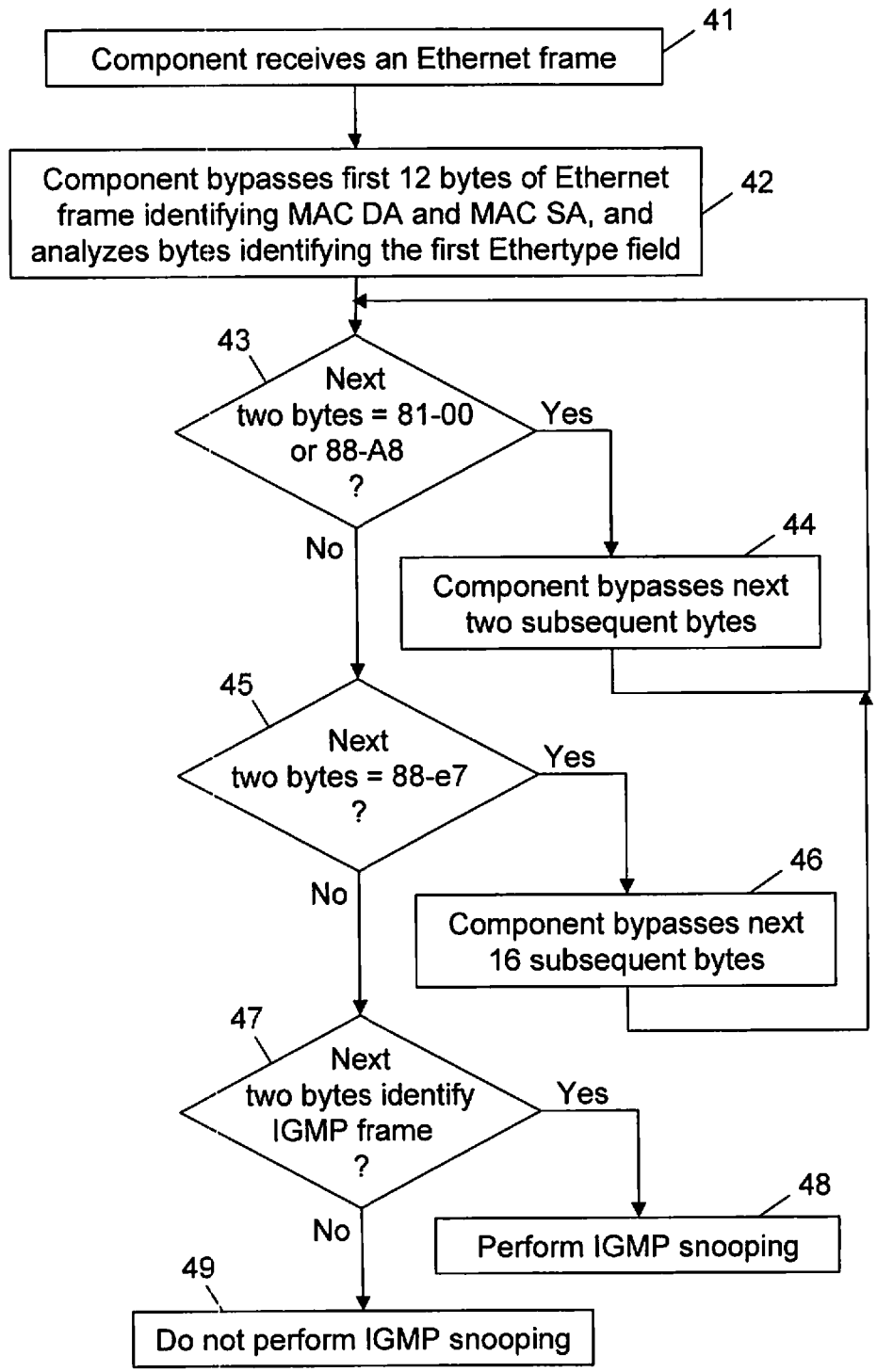
FIG. 4 is a flow chart illustrating the steps of an algorithm implemented by all bridge components for snooping the IGMP information whenever the MMRP protocol is not implemented by the Bridges in the Provider domain.

FIG. 4 is a flow chart illustrating the steps of an algorithm implemented by all bridge components for snooping the IGMP information whenever the MMRP protocol is not implemented by the Bridges in the Provider domain. As noted above, IGMP snooping is designed to prevent hosts on a local network from receiving traffic for a multicast group they have not explicitly joined. IGMP snooping enables a layer 2 switch to "listen in" on the IGMP conversation between hosts and routers by processing the layer 3 IGMP packets sent in a multicast network. IGMP snooping may be employed by intermediary nodes to prune multicast trees in a network to make efficient use of limited resources.

At step 41, a component receives an Ethernet frame. At step 42, the component bypasses the first 12 bytes of the Ethernet frame identifying the MAC DA and MAC SA, and analyzes the bytes identifying the first Ethertype field. At step 43, it is determined whether the next two bytes are equal to 81-00 or 88-A8. If so, the component bypasses the next two subsequent bytes at step 44 and repeats step 43. If the next two bytes are not equal to 81-00 or 88-A8, the method moves to step 45, where it is determined whether the next two bytes are equal to 88-e7. If so, the component passes the next 16 subsequent bytes at step 46 and returns to step 43. If not, the method moves to step 47, where it is determined whether the next two bytes are identifying an IGMP frame. If so, the method moves to step 48, where IGMP snooping is performed. If not, the method moves to step 49, where no snooping is performed.

Figure 5:
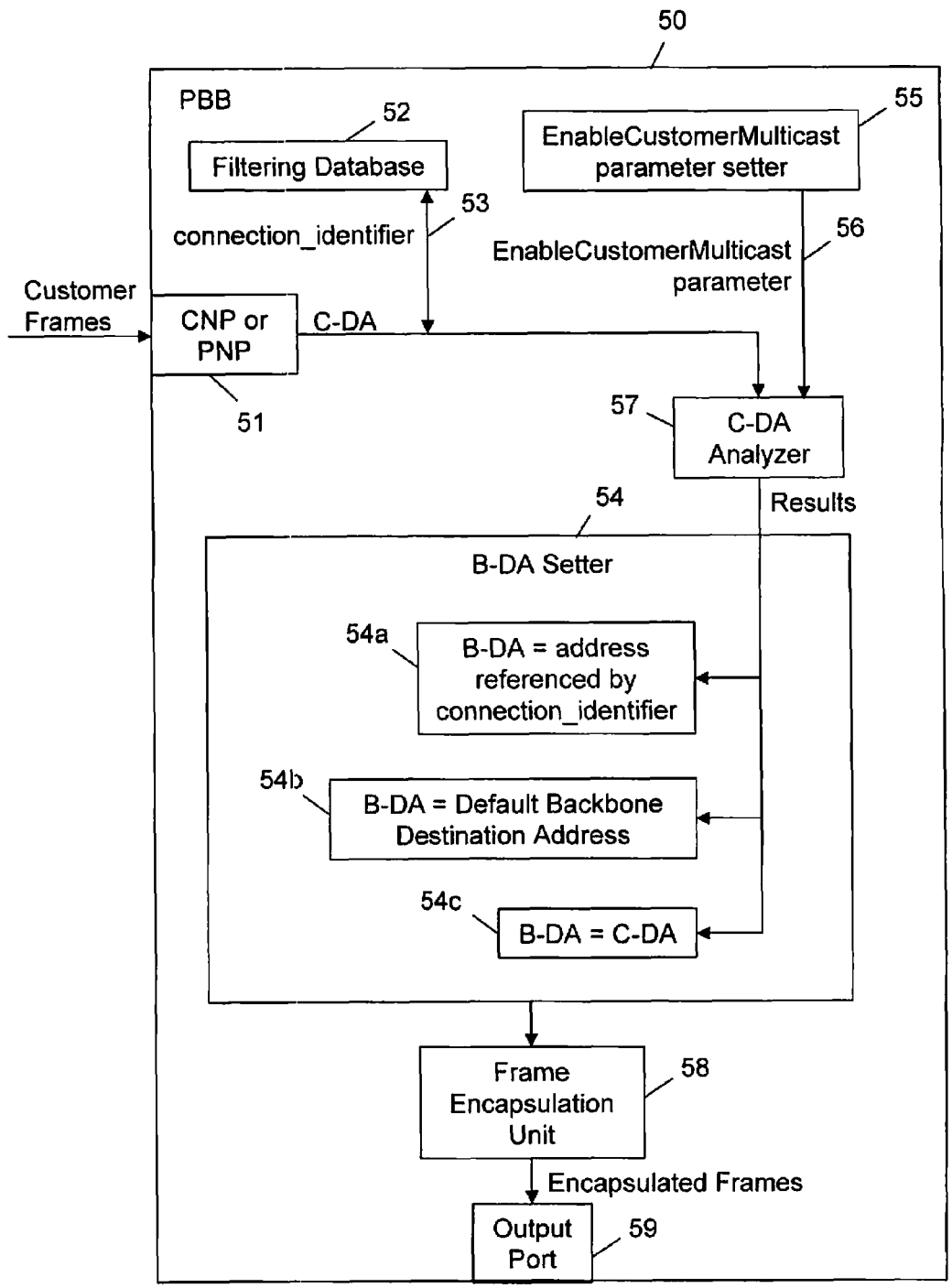
FIG. 5 is a simplified block diagram of a PBB in an exemplary embodiment of the present invention.

FIG. 5 is a simplified block diagram of a PBB 50 in an exemplary embodiment of the present invention. Customer frames are received in a CNP or PNP 51 of an I-component. The C-DA of the received frames is used to inquire the I-Component's Filtering Database and identify the set of ports that the frame is to be forwarded to. If the frames are to be forwarded to a Provider Backbone Bridged Network (PBBN), they are directed to a Virtual Instance Port (VIP) which is responsible for the encapsulation. In this case, the Filtering Database 52 provides a connection_identifier 53 associated with the received frame's C-DA. The connection_identifier is forwarded to a C-DA analyzer 57, which determines whether the connection_identifier is null. If the connection_identifier is not null, the connection_identifier references an address retained by the PIP. The results of the analysis are sent to a B-DA setter 54. In particular, when the connection_identifier is not null, B-DA setter unit 54a sets the value for the B-DA as the address referenced by the connection_identifier.

An EnableCustomerMulticast parameter setter 55 provides the EnableCustomerMulticast parameter 56 to the C-DA analyzer 57. The C-DA analyzer determines whether the received C-DA is a Group MAC address, and determines whether the EnableCustomerMulticast parameter of the VIP is set to one (1). If not, B-DA setter unit 54b sets the value of the B-DA as the contents of the Default Backbone Destination parameter of the Virtual Instance Port. However, when the received C-DA is a Group MAC address, and the EnableCustomerMulticast parameter of the VIP is set to one (1), B-DA setter unit 54c sets the value for the B-DA as the received C-DA.

A frame encapsulation unit 58 then encapsulates the frames with the selected destination address, and output port 59 propagates the encapsulated frames toward the destination.

The present invention may of course, be carried out in other specific ways than those herein set forth without departing from the essential characteristics of the invention. The present embodiments are, therefore, to be considered in all respects as illustrative and not restrictive and all changes coming within the meaning and equivalency range of the appended claims are intended to be embraced therein.

The invention claimed is:

1. A method of propagating multicast frames within a Provider Backbone Bridge Network (PBBN), wherein the multicast frames are received by a Customer Network Port or Provider Network Port on an I-component of a Provider Backbone Bridge (PBB) and are forwarded to a Virtual Instance Port (VIP) on the I-component, said method comprising the steps of:

determining whether an EnableCustomerMulticast parameter of the VIP on the I-component is set to a predefined value and whether the received frames are multicast frames by determining that an original Customer Destination Address (C-DA) of the received frames is a Group Media Access Control (MAC) address; and when the EnableCustomerMulticast parameter is set to the predefined value and the received frames are multicast frames:
    encapsulating by the Provider Backbone Bridge, the received multicast frames with a Backbone Destination Address (B-DA), wherein the B-DA is set equal to the original C-DA of the received multicast frames; and
    propagating the encapsulated frames to the C-DA.

2. The method according to claim 1, wherein when the EnableCustomerMulticast parameter is not set to the predefined value, the received frames are encapsulated with the B-DA equal to a Default B-DA, and the encapsulated frames are propagated to the Default B-DA.

3. The method according to claim 2, further comprising independently setting the EnableCustomerMulticast parameter for each Virtual Instance Port on the I-component.

4. The method according to claim 1, further comprising utilizing Internet Group Management Protocol (IGMP) snooping to prune multicast traffic from links that do not contain a multicast listener.

5. A Provider Backbone Bridge (PBB) within a Provider Backbone Bridge Network (PBBN), the PBB having a Customer Network Port or Provider Network Port on an I-component, wherein the Customer Network Port or Provider Network Port of the PBB is configured to receive multicast frames and forward multicast frames to a Virtual Instance Port (VIP) on the I-component, said PBB comprising:
    a Customer Destination Address (C-DA) analyzer configured to determine whether an EnableCustomerMulticast parameter of the VIP on the I-component is set to a predefined value and whether the received frames are multicast frames by determining that an original C-DA of the received frames is a Group Media Access Control (MAC) address;
    a frame encapsulation unit configured to encapsulate received multicast frames with a Backbone Destination Address (B-DA), wherein the B-DA is set equal to the original C-DA of the received multicast frames, when the EnableCustomerMulticast parameter is set to the predefined value and the received frames are multicast frames; and
    an output port for propagating the encapsulated frames toward the C-DA.

6. The PBB according to claim 5, wherein the C-DA analyzer includes an address reader that determines the C-DA of the received frames is a Group MAC address.

7. The PBB according to claim 5, further comprising:
    means for selectively setting an EnableCustomerMulticast parameter of a Virtual Instance Port on the I-component to a predefined value or a second value;
    wherein when the EnableCustomerMulticast parameter is set to the predefined value, the frame encapsulation unit is caused to encapsulate the received frames with the B-DA equal to the C-DA of the received customer multicast frames; and
    wherein when the EnableCustomerMulticast parameter is set to the second value, the frame encapsulation unit is caused to encapsulate the received frames with the B-DA equal to a Default B-DA.

8. The PBB according to claim 7, wherein the means for selectively setting the EnableCustomerMulticast parameter independently sets the EnableCustomerMulticast parameter for each Virtual Instance Port on the I-component.

9. The PBB according to claim 5, wherein the C-DA analyzer is configured to determine whether a connection_identifier associated with the C-DA is null, and if not null, to cause the frame encapsulation unit to encapsulate the received frames with an address referenced by the connection_identifier.

10. The method according to claim 1, wherein the multicast frames are received by an input port on the I-component of the Provider Backbone Bridge, and the method further comprises the steps of:
    analyzing a received frame to determine whether an associated connection_identifier is null;
    upon determining that the connection_identifier is not null, setting the B-DA equal to an address referenced by the connection_identifier;
    upon determining that the connection_identifier is null, determining whether the C-DA received in the customer multicast frames is a Group Media Access Control (MAC) address and the EnableCustomerMulticast parameter of the VIP on the I-component is set to the predefined value:
    upon determining that the received C-DA is a Group MAC address and the EnableCustomerMulticast parameter of the VIP is set to the predefined value, performing the encapsulating step; and
    upon determining that the received C-DA is not a Group MAC address, and/or the EnableCustomerMulticast parameter of the VIP is not set to the predefined value, setting the B-DA equal to the contents of a Default Backbone Destination parameter of the VIP.

11. The method according to claim 10, further comprising independently setting the EnableCustomerMulticast parameter for each Virtual Instance Port on the I-component.

12. The method according to claim 10, further comprising utilizing Internet Group Management Protocol (IGMP) snooping to prune multicast traffic from links that do not contain a multicast listener.

13. A computer-implemented method in a bridge component for identifying a received Ethernet frame as an Internet Group Management Protocol (IGMP) frame and for determining whether to perform IGMP snooping on the received Ethernet frame, the method comprising the steps of:
    a) bypassing by the component, a first twelve bytes of the Ethernet frame identifying a Media Access Control Destination Address, MAC DA, and Media Access Control Source Address, MAC SA, and analyzing subsequent bytes identifying a first Ethertype field;
    b) determining by the component whether the next two bytes are equal to 8-00 or 88-A8;
    c) upon determining that the next two bytes are equal to 81-00 or 68-A8, bypassing the next two subsequent bytes and repeating steps b) and c) until the next two bytes are not equal to 81-00 or 88-A8;
    d) when the next two bytes are not equal to 81-00 or 88-A8, determining by the component whether the next two bytes are equal to 88-e7;
    e) upon determining that the next two bytes are equal to 88-e7, bypassing by the component, the next 16 subsequent bytes and repeating steps b) through e) until the next two bytes are not equal to 88-e7;
    f) when the next two bytes are not equal to 88-e7, determining by the component whether the next two bytes identify an IGMP frame;
    g) upon determining that the next two bytes identify an IGMP frame, performing IGMP snooping on the frame; and
    h) upon determining that the next two bytes do not identify an IGMP frame, declining to perform IGMP snooping on the frame.

14. The method according to claim 1, wherein the Provider Backbone Bridge receives customer-initiated Media Access Control (MAC) Address Multiple Registration Protocol (MMRP) packet data units (PDUs) on the 1-component and propagates the MMRP PDUs to other Bridge ports within a Virtual Local Area Network (VLAN) context, the method further comprising the steps of:
- when the VIP is part of the VLAN context, setting the B-DA of the propagated MMRP PDUs according to the steps of:
  - when a connection_identifier associated with the received PDU is not null, setting the B-DA equal to an address referenced by the connection_identifier;
  - when the connection_identifier is null, determining whether the C-DA received in the PDU is a Group MAC address and whether the EnableCustomerMulticast parameter of the VIP is set to the predefined value;
  - when the received C-DA is a Group MAC address and the EnableCustomerMulticast parameter of the VIP is set to the predefined value, performing the encapsulating step; and
  - when the received C-DA is not a Group MAC address, and/or the EnableCustomerMulticast parameter of the VIP is not set to the predefined value, setting the B-DA equal to the contents of a Default Backbone Destination parameter of the VIP;
- receiving one of the propagated MMRP PDUs at a Customer Backbone Port on a B-Component that implements the MMRP protocol;
- determining by the receiving Customer Backbone Port, whether the received PDU is an MMRP PDU; and
- propagating all identified MMRP PDUs within the VLAN context corresponding to a Backbone VLAN Identifier (B-VID) value associated with the received PDU.

* * * * *

UNITED STATES PATENT AND TRADEMARK OFFICE
CERTIFICATE OF CORRECTION

PATENT NO. : 8,594,088 B2  
APPLICATION NO. : 12/921852  
DATED : November 26, 2013  
INVENTOR(S) : Saltsidis et al.

Page 1 of 1

It is certified that error appears in the above-identified patent and that said Letters Patent is hereby corrected as shown below:

On the Title Page, Item (56), under "OTHER PUBLICATIONS", in Column 2, Line 4, delete "IEEE: Piscataway." and insert -- IEEE, Piscataway, --, therefor.

In the Claims

In Column 8, Line 19, in Claim 10, delete "value:" and insert -- value; --, therefor.

In Column 8, Line 47, in Claim 13, delete "8-00 or 88-A8;" and insert -- 81-00 or 88-A8; --, therefor.

In Column 8, Line 49, in Claim 13, delete "68-A8," and insert -- 88-A8, --, therefor.

In Column 9, Line 4, in Claim 14, delete "1-component" and insert -- I-component --, therefor.

Signed and Sealed this  
Twenty-second Day of July, 2014

Michelle K. Lee  
*Deputy Director of the United States Patent and Trademark Office*